United States Patent [19]

Pugh et al.

[11] 4,167,075

[45] Sep. 11, 1979

[54] MEDITATION AID

[76] Inventors: Robert W. Pugh, 1428 Severn St., Pittsburgh, Pa. 15217; Bernard A. Frank, 226 S. Aiken Ave., Pittsburgh, Pa. 15206

[21] Appl. No.: 829,617

[22] Filed: Sep. 1, 1977

[51] Int. Cl.² ............................................. G09F 7/22
[52] U.S. Cl. ................................................... 40/617
[58] Field of Search ............... 40/617, 606; 43/7, 102; 428/28

[56] References Cited

U.S. PATENT DOCUMENTS

| | | | |
|---|---|---|---|
| 34,499 | 2/1862 | Holmes | 43/7 X |
| 2,723,481 | 11/1955 | Schwartz | 43/7 |
| 2,784,514 | 3/1957 | Casson | 43/7 |
| 3,030,718 | 4/1962 | Kirkman | 40/617 |

Primary Examiner—Louis G. Mancene
Assistant Examiner—Wenceslao J. Contreras
Attorney, Agent, or Firm—Robert D. Yeager

[57] ABSTRACT

A meditation aid is provided which has a rigid frame whose periphery defines a geometric shape. A plurality of identical flexible means for suspending the frame are attached to it and joined at a single point. The suspending means and frame define a three dimensional geometric figure such as a cone, pyramid or the like. Means are provided for adjusting the distance from the joinder point to the frame along with means for hanging the flexible means from a superstructure. Further means are provided for raising and lowering the frame.

10 Claims, 5 Drawing Figures

MEDITATION AID

BACKGROUND OF THE INVENTION

1. Field of the Invention

This invention relates to suspended meditation aids and more particularly to meditation aids which can be raised and lowered.

2. Description of the Prior Art

There has been an anthropological as well as a mystical interest in ancient pyramidal structures throughout history due to their occurrence in various locations throughout the world and their size alone. Current mystical interest has been intensified by experimenters who have concluded that objects placed under or on top of a pyramid have undergone some physical change. Reports of properties attributed to the pyramid shape can be found in Pyramid Power by Max Toth and Greg Nielsen, 1974, 1976 and in Beyond Pyramid Power by G. Pat Flanagan, 1976. Reportedly, the pyramid used to enhance physical change and further affect human beings who are proximate thereto, is one which is preferably scaled to the Great Pyramid of Giza which has one side of the base square aligned with geological north—south. People who have built such scaled pyramids take great care in the dimensions and alignment of their pyramid. It has been further theorized and reported that not only does the pyramid shape provide physical effects, but also the conical shape demonstrates physical change in objects and persons placed proximate thereto.

As can be well appreciated, persons who wish to use and experiment with the pyramid and conical shapes by placing things and persons thereunder have problems with storage of these objects when not in use since they are sometimes large in size.

Although the invention does not depend upon the effects provided by pyramids, cones and other geometric shapes, the present invention provides such shapes which are easily stored and convenient to use.

BRIEF DESCRIPTION OF THE INVENTION

A meditation aid is provided which has a rigid frame whose periphery defines a geometric shape. A plurality of identical flexible means for suspending the frame are attached to it and joined at a single point. The suspending means and frame define a three dimensional geometric figure such as a cone, pyramid or the like. Means are provided for adjusting the distance from the joinder point to the frame along with means for hanging the flexible means from a superstructure. Further means are provided for raising and lowering the frame.

The following drawings are illustrative of the invention where like reference numerals refer to like elements.

DETAILED DESCRIPTION OF THE DRAWINGS

Figure 1:
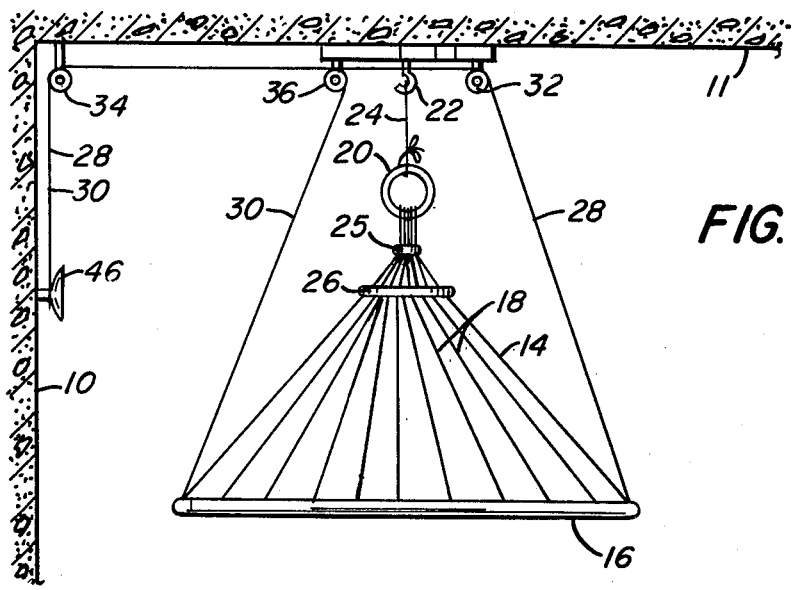
FIG. 1 is a front view of a suspended cone in accordance with the invention.
Figure 2:
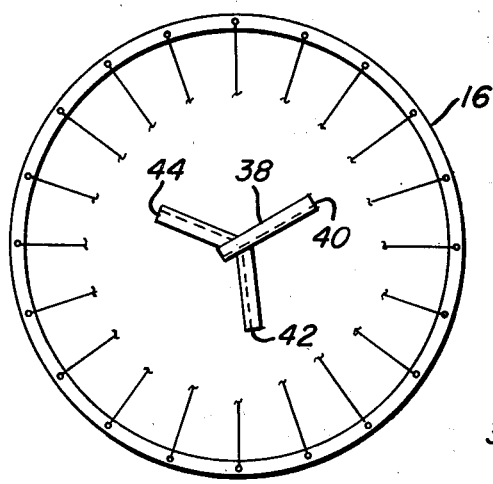
FIG. 2 is a top view with parts broken away of the embodiment shown in FIG. 1.

Referring now to FIGS. 1 and 2, there is shown a wall 10 and ceiling 11 from which the cone 14 is suspended. The cone 14 has a rigid frame 16 constructed in the form of a circle. The frame 16 may be plastic, metal or the like provided it is sufficiently rigid to retain the circular shape. A plurality of suspending means 18 are attached to the frame 16 and joined at a single point defined by ring 20. The suspending means 18 may be strings, wire or some suitable flexible material. The ring 20 is attached to hook 22 by a wire or string 24. The suspending means 18 in conjunction with the frame 16 define the cone 14. The angle of the cone from the base to the apex may be adjusted by adjusting ring 25. Adjusting ring 25 frictionally engages the suspending means 18 so that it may be slid along the suspending means and inherently fixed in position.

The raising and lowering cords 28 and 30 are mounted to frame 16 with cord 28 being threaded through pulley 32, 34 and 36 and cord 30 being threaded through pulley 36 and 34. Hook 22 is mounted on suspension frame 38 which is mounted on ceiling 11. Each of pulleys 36 and 34 along with a third pulley (not shown) is attached to each arm 40, 42 and 44 of suspension frame 38.

Figure 3:
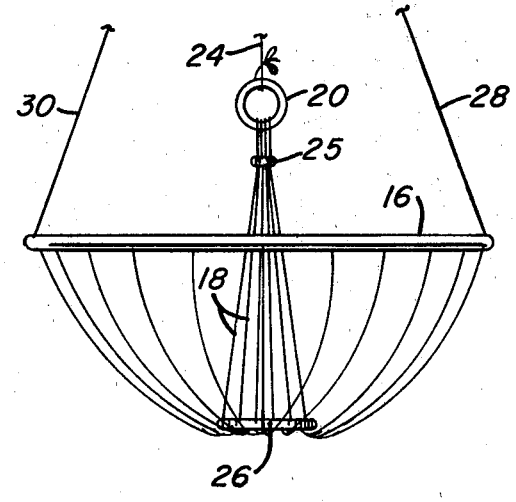
FIG. 3 is a front view with parts broken away of the embodiment shown in FIG. 1 when elevated.

In operation, the user of the cone mounts the suspension frame 38 to ceiling 11, suspension frame 38 is supplied with the pulleys 36, 32 and a third pulley (not shown) along with hook 22. Cords 30 and 28 are threaded through the pulleys as previously described along with ceiling mounted pulley 34. Wire 24 is then attached to hook 22 and the cone is now in suspension. When the user desires to have a hemispherical shape as is shown in FIG. 3, he raises the base by pulling downwardly on cords 30 and 28 and fastens the cords to stay 46. The weight ring 26 is sufficiently heavy to define the center of the hemispherical surface forming a counterbalance for the force exerted by cords 30 and 28. If the user wishes the cone or hemisphere to be in a stored position, he pulls cords 30 and 28 until frame 16 is parallel to the pulleys 32 and 36.

Figure 4:
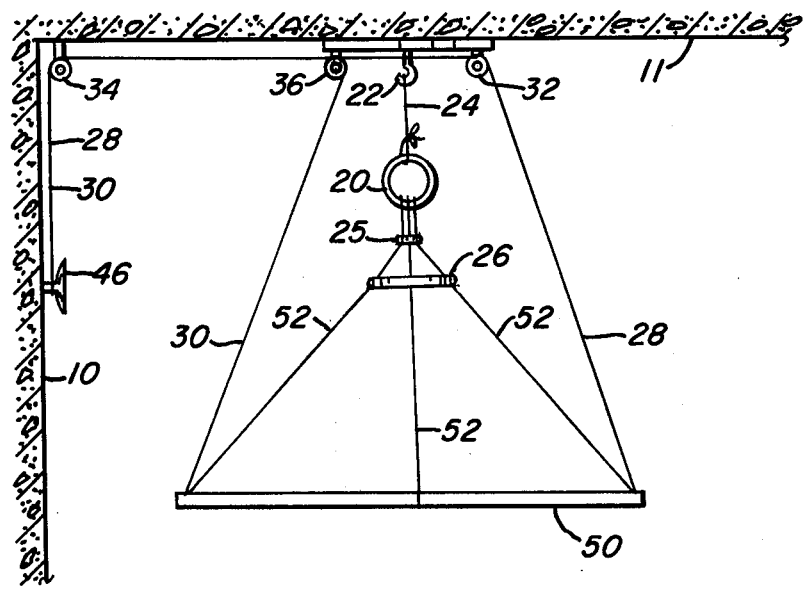
FIG. 4 is a front view of a suspended pyramid in accordance with the invention.
Figure 5:
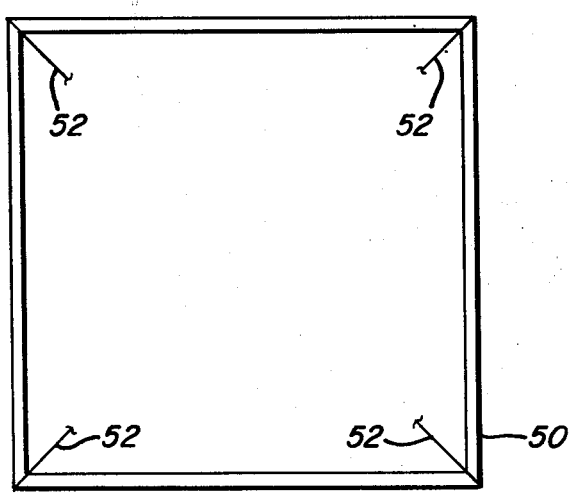
FIG. 5 is a top view with parts broken away of the embodiment shown in FIG. 4.

Referring now to FIGS. 4 and 5, the suspension arrangement shown in FIGS. 1-3 is utilized. However, the shape defined by the rigid frame 50 and the flexible suspension means is a pyramid. The frame 50 is a square with suspending means 52 attached to the vertices of the frame 50. Additional suspension means may be employed if desired. Except for the shape of the rigid frame 50 in the embodiment shown in FIGS. 4 and 5, the structure is identical to that shown in FIGS. 1-3.

Thus, when the frame 50 is elevated by pulling on ropes 30 and 28 an inverted pyramid is defined by the frame 50 with the periphery of the suspension means defining planes of the pyramid having an apex at adjusting ring 26. The frame and the suspending means define the shape of the final three dimensional figure. A circular, triangular, square, rectangular or polygonal frame may be used to produce the particular shape desired.

What is claimed is:

1. A meditation aid comprising:
   a frame, the periphery of said frame defining a rigid planar geometric shape;
   a plurality of identical flexible means for suspending said frame attached to said frame;

means for separably joining said flexible means at a single point, the periphery of said flexible means defining a three dimensional geometric shape;

means for adjusting said joining means to change the point on said flexible means where said flexible means are separably joined, said adjustment being effected by moving said adjusting means;

means for hanging said flexible means from a superstructure; and means for raising and lowering said frame.

2. The meditation aid of claim 1 wherein said planar geometric shape is a circle.

3. The meditation aid of claim 1 wherein said planar geometric shape is a square.

4. The meditation aid of claim 1 wherein said planar geometric shape is a triangle.

5. The meditation aid of claim 1 wherein said planar geometric shape is a polygon.

6. The meditation aid of claim 2 wherein said three dimensional shape is a cone.

7. The meditation aid of claim 3 wherein said three dimensional geometric shape is a pyramid.

8. The meditation aid of claim 1 wherein said flexible suspending means are strings.

9. The meditation aid of claim 1 wherein said means for joining said suspension means is a ring which frictionally engages and groups said suspension means.

10. The meditation aid of claim 1 wherein said means for raising and lowering said frame is comprised of:

at least three adjusting ropes, one end of each adjusting rope being attached to said frame, and pivoting means for said ropes being mounted above said frame.

* * * * *